United States Patent

Bone, Jr.

[11] Patent Number: 6,082,620
[45] Date of Patent: Jul. 4, 2000

[54] LIQUID CRYSTAL DYNAMIC BARCODE DISPLAY

[76] Inventor: Wilburn I. Bone, Jr., 8328 Havard, Raytown, Mo. 64138

[21] Appl. No.: 08/998,307

[22] Filed: Dec. 24, 1997

[51] Int. Cl.[7] .................................................. G06K 19/00
[52] U.S. Cl. ...................... 235/462.16; 235/487; 235/494
[58] Field of Search ............................. 235/462.16, 494, 235/487, 375

[56] References Cited

U.S. PATENT DOCUMENTS

| | | | |
|---|---|---|---|
| 2,408,931 | 3/1943 | Heath et al. | 134/38 |
| 3,470,357 | 9/1969 | Ritzerfeld et al. | 235/494 |
| 3,629,559 | 12/1971 | Cassaday | 377/15 |
| 3,721,806 | 3/1973 | Stothart | 235/61 PD |
| 4,114,033 | 9/1978 | Okamoto et al. | 235/494 |
| 4,204,639 | 5/1980 | Barber et al. | 235/488 |
| 4,531,051 | 7/1985 | Sagmuller | 235/1 C |
| 4,667,293 | 5/1987 | Krieger et al. | 395/212 |
| 4,680,704 | 7/1987 | Konicek et al. | 364/525 |
| 4,746,932 | 5/1988 | Sato | 346/136 |
| 4,864,112 | 9/1989 | Imai et al. | 235/463 |
| 4,956,639 | 9/1990 | Uemura et al. | 345/180 |
| 5,003,251 | 3/1991 | Fuoco | 324/764 |
| 5,064,222 | 11/1991 | Legault | 283/71 |
| 5,083,816 | 1/1992 | Folga et al. | 283/81 |
| 5,153,842 | 10/1992 | Dlugos, Sr. et al. | 364/478.15 |
| 5,171,976 | 12/1992 | Bone, Jr. | 235/375 |
| 5,270,522 | 12/1993 | Bone, Jr. | 235/375 |
| 5,389,771 | 2/1995 | Amendolia | 235/454 |
| 5,421,897 | 6/1995 | Grawe | 134/6 |
| 5,513,264 | 4/1996 | Wang et al. | 380/51 |
| 5,594,493 | 1/1997 | Nemirofsky | 235/383 |
| 5,789,732 | 8/1998 | McMahon et al. | 235/487 |
| 5,814,799 | 9/1998 | Swartz et al. | 235/383 |

OTHER PUBLICATIONS

Zellweger Code (1973), "Punch Cards to Bar Codes," by Nelson, Benjamin, p. 397, 1997.
USS–39; Aim, Inc.; 1326 Freeport Rd.; Pittsburg, PA 15238; 1986.
Code 39; Intermec Corp.; 4405 Russell Rd.; Lynnwood, WA 98046–9702; (206) 348–2600; 1986.
Giant Step Brochure; Aim, Inc.; 1326 Freeport Rd.; Pittsburg, PA 15238; 1988.
Auto ID; Distribution Magazine; Jun., 1990; pp 66, 68, 70.
Osha Regulated Heavy Metals, Internet, pp. 1–2, Nov. 1998.

*Primary Examiner*—Donald Hajec
*Assistant Examiner*—Drew A. Dunn
*Attorney, Agent, or Firm*—Shughart, Thomson & Kilroy L.C.; Mark E. Brown

[57] ABSTRACT

A liquid crystal dynamic barcode display apparatus includes a liquid crystal layer having a plurality of elongated barcode display elements positioned in close side-by-side parallel relation formed thereon. The barcode display elements are activated in patterns to form a barcode pattern which can be scanned by a conventional barcode scanner. Spacing between adjacent barcode display elements is less than that which can be detected by the barcode scanner such that multiple adjacent barcode display elements can be activated to form relatively wide bars of the barcode symbology. Preferably, the display apparatus also includes alphanumeric display elements which are simultaneously activated to form human readable symbols corresponding to characters represented by the barcode pattern.

12 Claims, 1 Drawing Sheet

LIQUID CRYSTAL DYNAMIC BARCODE DISPLAY

BACKGROUND OF THE INVENTION

The present invention relates to counting and measuring devices and, more particularly, to a liquid crystal display capable of dynamically displaying barcodes and being read by conventional barcode scanning devices.

There are many requirements in various areas of industry, transportation, warehousing, marketing, and the like for counting and measuring for asset identification and tracking, inventory control, and other functions. Such counting or measuring is typically recorded and forms the basis for charging customers for goods or services delivered or reporting on current inventory on hand or at various stages of manufacturing.

In the utility industry, the count or measurement is typically the number of gas, water, or electric power units delivered to a given customer. In chemical manufacturing processes, the measurement could be the volumes units of a bulk material moved from one process stage to the next. Additionally, it may be desirable to record process state variables at various time intervals, such as pressure, temperature, elapsed time in a process stage, or the like. In transportation, counted units or measured weights are transported over measured distances. And so forth.

In the past, counts and measurements were typically recorded manually and transferred from report to report manually. Such methods of recording counts and measurements are prone to entry or transcription errors which can result in overcharges or undercharges to customers, reduced quality in manufactured goods, and often costly remedial actions to compensate for the errors.

Great strides have been made in overcoming accuracy problems in many areas involving counting and tracking of assets, most notably in inventory identification and tracking, through the use of automatic identification mechanisms such as barcodes along with computerized inventory tracking systems. Barcode technologies have been most successfully applied to circumstances dealing with discrete articles which can be labelled with a barcode and then optically scanned upon entering an inventory and also upon leaving, such as through sale of the products. In stores, the scanning of barcoded merchandise speeds up the check out process and increases its accuracy since the price of the item can be called up by the system upon scanning rather than entered manually. Additionally, inventory can be updated concurrently by decrementing the inventory count of an item when it is scanned for sale.

Instruments which automatically record counts or measurements are known which either store a value or transmit a value to another device such as a computer or a readout device. In general, there are few instruments which can indicate a value or count and which can be queried with a separate device, other than those which use transponders or to which an electrical or mechanical connection must be made. Exceptions to this are disclosed in U.S. Pat. Nos. 5,171,976 and 5,270,522 issued on Dec. 15, 1992 and Dec. 14, 1993 respectively to the present inventor. These patents disclose dynamic barcoded metering devices, such as barcoded odometers, which can be optically scanned. The term "dynamic barcode" refers to the capability of these devices to change the displayed barcode to indicate a current reading. U.S. Pat. Nos. 5,171,976 and 5,270,522 are incorporated herein by reference.

Although dynamic barcoded odometers have utility in many applications, odometers are not appropriate for all applications. U.S. Pat. Nos. 5,171,976 and 5,270,522 make general references to dynamic barcoded liquid crystal display devices in which the displayed barcode is altered electronically, according to a currently sensed count or measurement.

Conventional barcode patterns are made up of combinations of thick and thin "bars" or linear elements, such as thick and thin dark bars combined with thick and thin light bars or separations. Some barcodes have multiple bar thicknesses. Each alphanumeric symbol to be represented is associated with a unique barcode pattern. The barcode pattern is typically read by a laser scanner device which scans a laser beam across the pattern and detects reflections from the pattern using a photosensitive device. Sensed reflections from the barcode elements are used to generate pulses having pulse lengths proportional to the thicknesses of the bars. Timing circuits within the scanning device measure the width of the pulses and spaces therebetween which are, in effect, negative barcode elements. Logic circuitry within the scanner associates the detected pulse patterns with the corresponding characters. A scanner may scan a pattern multiple times to increase accuracy. If the scanned pattern does not correspond to a known character, an error condition is indicated.

Many barcode "symbologies" have been developed and have characteristics which are appropriate for particular applications. Barcode symbologies fall into two general categories: discrete symbologies and continuous symbologies. In a discrete code, each character can stand alone and can be decoded independently from adjacent characters. Each character is separated from the adjacent characters by loosely toleranced intercharacter gaps which contain no information. Every character has a bar at each end. A continuous code has no intercharacter gaps. Every character starts with a bar and ends with a space. The end of one character is indicated by the start of the next. An example of a common discrete code is Code 39 which can represent alphabetic, numeric, and control characters. A commonly used continuous code is Universal Product Code (UPC) which is a numeric only code used widely in the marking of consumer products.

SUMMARY OF THE INVENTION

The present invention provides a liquid crystal dynamic barcode display apparatus which displays a value or reading in a barcode symbology and, preferably, also in human readable symbols, such as alphanumeric characters. The barcode portion of the apparatus is formed by a plurality of relatively thin barcode display elements positioned in side-by-side parallel relation. The spacing between the barcode display elements is substantially less than the thickness of a thin bar of the barcode symbology and also less than the diameter or width of the light beam which will be used to scan the pattern, such that the spaces between the active adjacent elements cannot be detected by the barcode scanner as barcode spaces.

In general, barcode patterns are formed on the display apparatus by activating relatively fewer adjacent display elements to form a thin barcode element and a relatively greater number of display elements to represent a thick barcode element. For example, a single display element can be activated to form a thin bar element while three adjacent display elements are activated to form a thick bar element. In such a coding scheme, each barcode display element has a thickness greater than the diameter or beamwidth of the scanning laser beam. Preferably, the display also includes numeric display elements which can be activated to form human readable characters, such as seven segment elements to display numerals only or dot matrix elements to display alphanumeric and control characters. The display apparatus of the present invention may include "permanently activated" or printed elements to form start and stop characters of the barcode pattern.

A readout instrument incorporating the display apparatus includes barcode encoder circuitry which converts a digital code, such as a binary code, into corresponding activation signals to cause the appropriate barcode display elements to activate into a barcode pattern representing the appropriate character. The barcode encoder circuitry may be a simple diode matrix or may be a programmable type of device for more universal application. In order to allow analog values to be displayed, the barcode encoder circuitry includes analog to digital converter circuitry. In a similar manner, the alphanumeric display elements of the display apparatus are fed by alphanumeric encoder circuitry which causes the appropriate alphanumeric elements to be activated to display the desired alphanumeric characters.

The liquid crystal display device employs conventional technology to provide the display elements which can be darkened relative to the surrounding area by electrical activation of the display elements. Current liquid crystal display technology can provide contrast between activated elements and nonactivated or inactive regions which is adequate for reading by conventional barcode scanner devices. The barcode encoder circuitry includes drivers which provide the required voltage to activate the barcode display elements along with latching circuitry which retains the activation state until subsequently changed. Although liquid crystal display technologies are preferred in the present invention, other thin panel or solid state display technologies are envisioned as alternatives.

The liquid crystal dynamic barcode display apparatus of the present invention may be used in a number of applications as a readout device for digital instruments, such as counters of various types; analog instruments, such as voltmeters, thermometers, pressure gauges, and the like; and other uses. The display apparatus could, for example, form a programmable label device on which the displayed barcode is entered using a keypad and then used to temporarily identify an article, component, location or the like. Subsequently, the barcode could be changed to identify a different item.

OBJECTS AND ADVANTAGES OF THE INVENTION

The principal object s of the present invention are: to provide an improved barcode device and, particularly, to provide a liquid crystal dynamic barcode display apparatus; to provide such an apparatus which also displays human readable symbols corresponding to the barcode pattern displayed; to provide such an apparatus including a plurality of thin barcode elements positioned in side-by-side parallel relation and which can be activated individually to form barcode patterns; to provide such an apparatus in which a fewer number of display elements are activated or a single display element is activated to represent thinner the barcode elements of the barcode symbology and in which a greater number of adjacent display elements are activated to represent thicker barcode elements; to provide such an apparatus in which the spacing between adjacent display elements is much less than the width of a single display element and much less than the diameter or beamwidth of the laser beam used to scan the barcode pattern so that the spacing between adjacent display elements cannot be detected by the barcode scanner device; to provide such an apparatus including alphanumeric display elements, such as seven segment elements or dot matrix elements which can be activated to display alphanumeric or control characters readable by humans; to provide such an apparatus in which barcode elements representing start and step characters are permanently activated when the apparatus is energized or which are permanently imprinted on the display apparatus; to provide such an apparatus including barcode encoder circuitry which converts a digital code, such as a binary code, to an activation pattern of signals to cause activation of the barcode display elements corresponding to the content of the digital code; to provide such an apparatus including analog to digital converter circuitry so that the display apparatus can display analog derived values; to provide such an apparatus which displays a barcode pattern which can be scanned by a conventional barcode scanner device; to provide such an apparatus which can form a readout device for a wide variety of instruments for counting and measuring; to provide such an apparatus which can be configured to display a wide variety of barcode symbologies; to provide such an apparatus which can effectively employ solid state display technologies other than liquid crystal display technology; and to provide such a liquid crystal dynamic barcode display apparatus which is economical to manufacture, which is efficient and precise in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
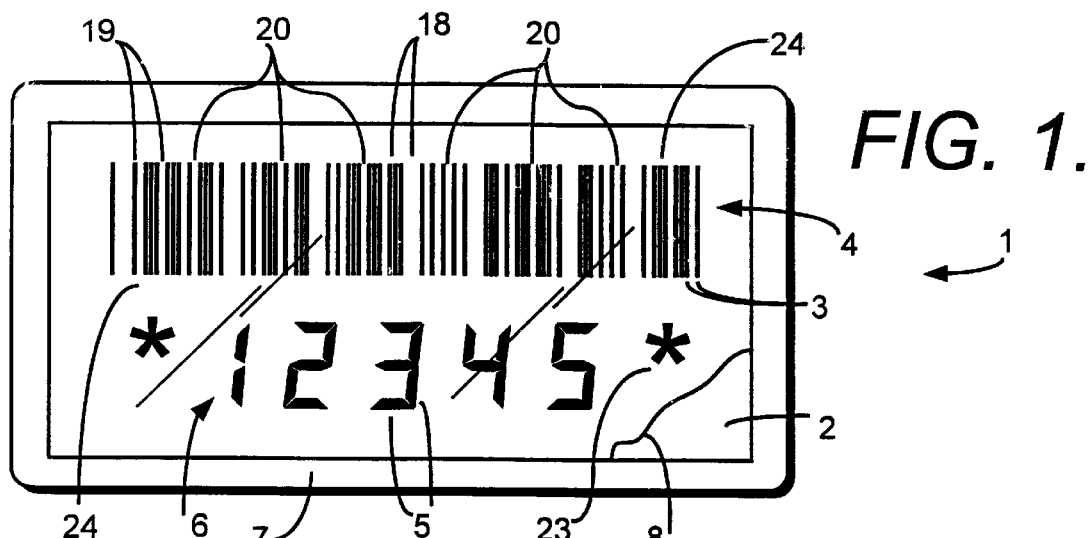
FIG. 1 is a front elevational view of a liquid crystal dynamic barcode display apparatus which embodies the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a liquid crystal dynamic barcode display apparatus which embodies the present invention. The apparatus 1 generally includes a liquid crystal display (LCD) layer 2 (FIG. 1) in which are formed a plurality of thin elongated barcode display elements 3 which can be activated individually in selected patterns to form a barcode pattern 4 which can be scanned by a conventional barcode scanner device (not shown). The LCD layer 2 also preferably includes alphanumeric display elements 5 which can be selectively activated to form human readable symbols, such as alphanumeric characters 6. The apparatus 1 includes a housing 7 in which the LCD layer 2 is positioned and a transparent cover or window 8 which provides a protective barrier for the LCD Layer 2.

Figure 3:
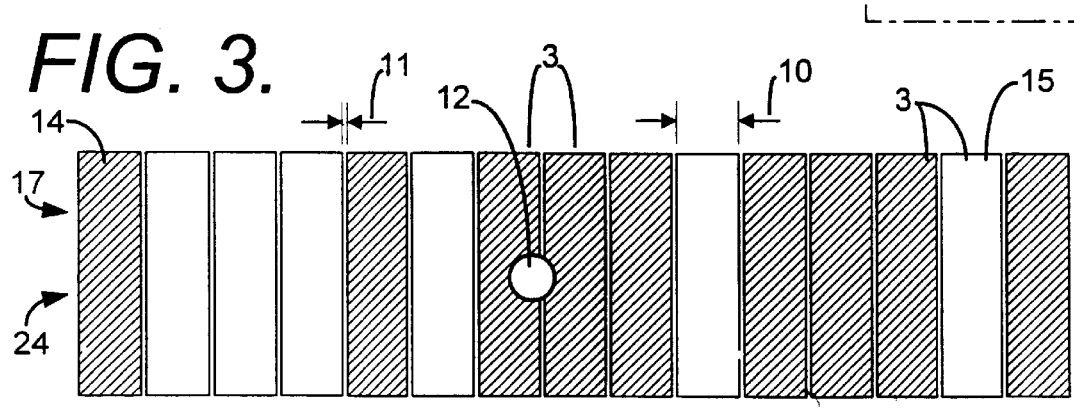
FIG. 3 is a greatly enlarged diagrammatic view illustrating barcode display elements forming a single character of a barcode symbology and showing a pattern of activation of the display elements to form a barcode character.

The barcode display elements 3 are thin bar shaped regions of the LCD layer 2 which can be activated by an appropriate voltage applied thereacross. The elements 3 are positioned in parallel, side-by-side relation. Referring to FIG. 3, the elements 3 have a width or thickness 10 which is greater than the element spacing 11 between the elements 3 and which is greater than a diameter or beamwidth of a laser beam 12 of a barcode scanner (not shown) which will read the barcode pattern 4. The thickness 10 may be on the order of about 0.021 inch, while the element spacing 11 may be in a range of 0.001 to 0.003 inch.

The barcode symbology illustrated in FIGS. 1 and 3 is Code 39, although the present invention is not intended to be restricted to any particular barcode symbology. Each Code 39 barcode character has five bars 14 and four spaces 15. In the apparatus 1, the bars 14 are activated barcode display elements 3, while the spaces 15 are formed by unactivated elements 3. In FIG. 3, the activated elements 3 are crosshatched, while the unactivated elements 3 are plain. Of these nine elements, three are wide or thick barcode elements 18 (FIG. 1) and six are narrow or thin barcode elements 19, for which reason Code 39 is referred to as a "two-width" code. Code 39 is also referred to as the 3 of 9 Code, referring to the three wide elements 18 out of a total of nine. A typical width ratio of thick elements 18 to thin elements 19 is three to one in the Code 39 barcode symbology. Code 39 can represent alphabetic characters, numeric characters, and graphic or control characters.

In the apparatus 1 illustrated, a single barcode display element 3 is used to form a thin or narrow element 19, while three adjacent barcode display elements 3 form a thick element 18. Thus, nine barcode display elements 3, whether activated or not, are used to form the three thick barcode elements 18; and six additional barcode display elements 3 form the six thin barcode elements 19. For this reason, each character represented by a Code 39 symbology using the apparatus 1 requires a total of fifteen barcode display elements 3. The fifteen barcode elements 3 shown in FIG. 3 form a single barcode character 17, which is coded to represent the asterisk character "*" 23 (FIG. 1). An intercharacter gap 20 (FIG. 1) occurs between each adjacent pair of barcode characters 17. The gap 20 must be wide enough to be detected by the scanning beam, and the maximum width of the gap 20 is limited to prevent misreading of characters. A typical gap 20 is on the order of about 0.042 inch.

The alphanumeric characters 6 illustrated in FIG. 1 are numeric characters formed by conventional seven segment display elements 5. The asterisks 23 shown in FIG. 1 are used to represent the start/stop character 24 in Code 39. The barcode pattern 4 illustrated in FIG. 1 represents the illustrated alphanumeric characters "*12345*" in Code 39. Since all Code 39 barcode patterns 4 begin and end with the asterisk character 23, the barcode display elements 3 representing the start/stop barcode character 24, as well as the asterisk character 23 itself, can be permanently displayed. This can be done by permanently activating the barcode display elements 3 whenever the apparatus 1 is energized or by permanently imprinting the start/stop barcode display elements on the LCD layer 2 or the window 8.

Conventional liquid crystal display (LCD) technology is used to form the LCD layer 2 and the various active elements thereon. Present LCD technology is capable of forming active elements with enough contrast to nonactivated elements and inactive regions of the LCD layer 2 to allow scanning of the barcode pattern 4 using conventional barcode scanning equipment. Additionally, the close element spacing 11 required in the apparatus 1 can be accomplished using conventional LCD technology. While LCD technology is preferred in forming the display apparatus 1, the present invention contemplates fabricating the display apparatus 1 using other thin panel and solid state display technologies, and such other embodiments of the apparatus 1 are considered to be encompassed within the spirit of the present invention.

Figure 2:
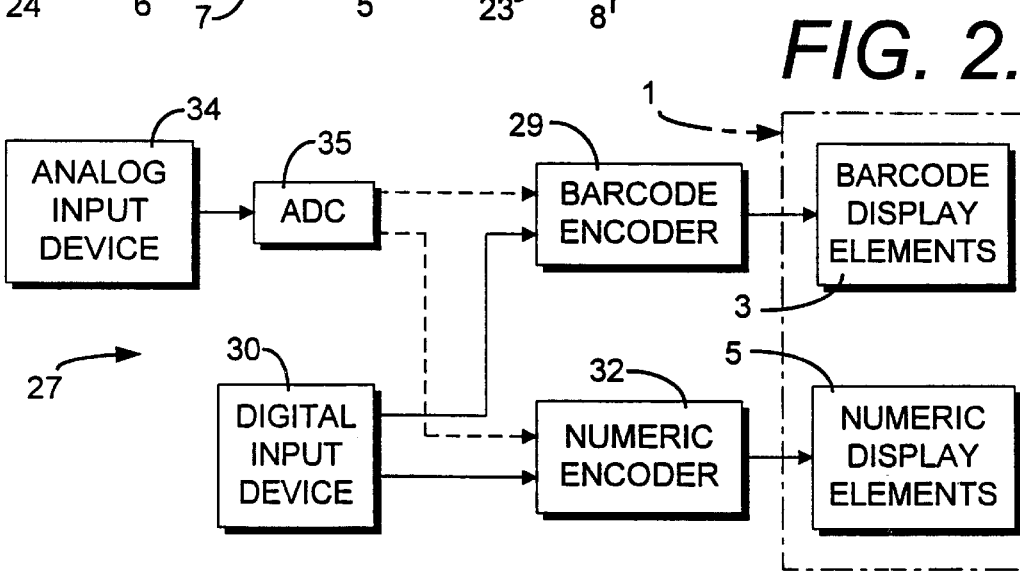
FIG. 2 is a simplified block diagram illustrating encoder circuitry for activating barcode display elements and numeric display elements of the display apparatus.

FIG. 2 illustrates input and encoding circuitry 27 which supplies activation signals for the barcode display elements 3 and the numeric display elements 5 of the apparatus 1. Barcode encoder circuitry 29 receives a binary signal from a digital input device 30 and converts the binary code to an activation pattern to form the barcode pattern 4 displayed on the apparatus 1, using the barcode display elements 3, which corresponds to the content of the binary signal from the digital input device 30. Similarly, numeric encoder circuitry 32 receives the same binary signal from the digital input device 30 and provides an activation pattern to activate the numeric display elements 5 to display numerals 6 representing the content of the binary signal. The numeric encoder circuitry 32 may be a conventional seven segment encoder for use with the illustrated apparatus 1 using the seven segment characters 6. Alternatively, a dot matrix encoder could be used for the encoder 32 for full alphanumeric characters 6. Encoding circuitry which converts from one code to another code is well known and believed to be within the ordinary level of skill in electronic encoding. Thus, the specific design of the barcode encoder circuitry 29 is not detailed further herein. The barcode encoder 29 and numeric encoder 32 preferably include latching circuitry (not shown) to maintain the displayed patterns until subsequently changed by a later reading.

The digital input device 30 may be any device which outputs a digital code, such as a clock circuit, a counting circuit, a dedicated computer, a keypad encoder, or the like. The apparatus 1 is also capable of displaying values provided by an analog input device 34 by the use of analog to digital converter (ADC) circuitry 35. The ADC circuitry 35 converts an analog level provided by the analog input device 34 to a digital code and may include rounding or interpolation circuitry (not shown) to avoid uncertainties in the lower significant characters 17 and 6 of the apparatus 1. The ADC circuitry 35 connects the analog input device 34 to the barcode encoder 29 and the numeric encoder 32. It is unlikely that both an analog input device 34 and a digital input device 30 would be connected to the same display apparatus 1. For this reason, this connector lines from the ADC circuitry 35 to the barcode encoder 29 and the numeric encoder 32 are shown as broken lines in FIG. 2. The analog input device 34 may be, for example, a voltmeter, a thermometer, a pressure gauge, or any other instrument which measures an analog value or a continuously variable value.

It is to be understood that while certain forms of the present invention have been illustrated and described herein, it is not to be limited to the specific forms or arrangement of parts described and shown.

What is claimed and desired to be secured by letters patent is as follows:

1. A liquid crystal dynamic barcode display apparatus for visually displaying a dynamic barcode pattern readable by a scanning light beam having a selected beamwidth, said barcode pattern including relatively thick barcode elements and relatively thin barcode elements, and said apparatus comprising:

(a) a liquid crystal display device including a plurality of relatively thin and elongated barcode display elements positioned in side by side parallel relation, said barcode display elements having a spacing between adjacent barcode display elements which is less than said beamwidth, each barcode display element capable of being activated individually;

(b) decoder circuitry coupled to said barcode display elements and converting a numeric code input thereto into activation signals to thereby display a barcode pattern corresponding to said numeric code by activating a relatively greater number of adjacent barcode display elements to represent each thick barcode element and a relatively lesser number of adjacent barcode display elements to represent each thin barcode element;

(c) input circuitry coupled to said decoder circuitry and conveying thereto a numeric code;

(d) said apparatus being adapted to display a selected barcode symbology having a defined width ratio of a width of said relatively thick barcode element to said relatively thin barcode element; and (e) said decoder circuitry being configured to cause activation of said barcode display elements to display said barcode pattern at an element thickness ratio of said relatively greater number of adjacent barcode display elements to said relatively lesser number of adjacent barcode display elements which is substantially equal to said defined width ratio of said barcode symbology.

2. An apparatus as set forth in claim 1 and including:

(a) said liquid crystal display device including a plurality of numeral elements capable of being activated to display numerals; and (b) numeral decoder circuitry coupled between said input circuitry and said numeral elements and converting said numeric code to numeral activation signals to thereby activate selected ones of said numeral elements to thereby provide a human readable representation of said numeric code.

3. An apparatus as set forth in claim 1 and including:

(a) a transparent layer positioned in overlying relation to said liquid crystal display device;

(b) a barcode start pattern imprinted on said layer at one end of said barcode pattern and a barcode stop pattern imprinted on said layer at an opposite end of said barcode pattern; and (c) said barcode start and stop patterns forming a complete readable barcode pattern in cooperation with the displayed barcode pattern.

4. An apparatus as set forth in claim 1 and including:

(a) a plurality of barcode start display elements positioned at a start end of said barcode pattern and forming a barcode start pattern;

(b) a plurality of barcode stop display elements positioned at an opposite end of said barcode pattern from said barcode start pattern and forming a barcode stop pattern;

(c) said barcode start and stop display elements being activated whenever said liquid crystal display device is activated; and (d) said barcode start and stop patterns forming a complete readable barcode pattern in cooperation with the displayed barcode pattern.

5. An apparatus as set forth in claim 1 wherein:

(a) each thin barcode element is represented by a single activated barcode display element.

6. An apparatus as set forth in claim 1 and including:

(a) said input circuitry including a digital to analog converter circuit operative to convert an analog electrical level to said numeric code.

7. A thin panel dynamic barcode display apparatus for visually displaying a dynamic barcode pattern readable by a scanning light beam having a selected beamwidth, said barcode pattern including relatively thick barcode elements and relatively thin barcode elements, and said apparatus comprising:

(a) a thin panel display device including a plurality of relatively thin and elongated barcode display elements positioned in side by side parallel relation, said barcode display elements having a spacing between adjacent barcode display elements which is less than said beamwidth, each barcode display element capable of being activated individually;

(b) decoder circuitry coupled to said barcode display elements and converting a numeric code input thereto into activation signals to thereby display a barcode pattern corresponding to said numeric code by activating a relatively greater number of adjacent barcode display elements to represent each thick barcode element and a relatively lesser number of adjacent barcode display elements to represent each thin barcode element;

(c) input circuitry coupled to said decoder circuitry and conveying thereto a numeric code;

(d) said apparatus being adapted to display a selected barcode symbology having a defined width ratio of a width of said relatively thick barcode element to said relatively thin barcode element; and (e) said decoder circuitry being configured to cause activation of said barcode display elements to display said barcode pattern at an element thickness ratio of said relatively greater number of adjacent barcode display elements to said relatively lesser number of adjacent barcode display elements which is substantially equal to said defined width ratio of said barcode symbology.

8. A liquid crystal dynamic barcode display apparatus for visually displaying a dynamic barcode pattern readable by a scanning light beam having a selected beamwidth, said barcode pattern including relatively thick barcode elements and relatively thin barcode elements, and said apparatus comprising:

(a) a liquid crystal display device including a plurality of relatively thin and elongated barcode display elements positioned in side by side parallel relation, said barcode display elements having a spacing between adjacent barcode display elements which is less than said beamwidth, each barcode display element capable of being activated individually;

(b) decoder circuitry coupled to said barcode display elements and converting a numeric cods input thereto into activation signals to thereby display a barcode pattern corresponding to said numeric code by activating a relatively greater number of adjacent barcode display elements to represent each thick barcode element and a relatively lesser number of adjacent barcode display elements to represent each thin barcode element;

(c) input circuitry coupled to said decoder circuitry and conveying thereto a numeric code;

(d) barcode start indicia corresponding to a barcode start pattern positioned at a start end of said barcode pattern;

(e) barcode stop indicia corresponding to a barcode stop pattern positioned at a stop end of said barcode pattern opposite said start end of said barcode pattern;

(f) said barcode start and stop patterns forming a complete readable barcode pattern in cooperation with the displayed barcode pattern;

(g) said apparatus being adapted to display a selected barcode symbology having a defined width ratio of a width of said relatively thick barcode element to said relatively thin barcode element; and (h) said decoder circuitry being configured to cause activation of said barcode display elements to display said barcode pattern at an element thickness ratio of said relatively greater number of adjacent barcode display elements to said relatively lesser number of adjacent barcode display elements which is substantially equal to said defined width ratio of said barcode symbology.

9. An apparatus as set forth in claim 8 and including:

(a) said display device including a plurality of numeral elements capable of being activated to display numerals; and (b) numeral decoder circuitry coupled between said input circuitry and said numeral elements and converting said numeric code to numeral activation signals to thereby activate selected ones of said numeral elements to thereby provide a human readable representation of said numeric code.

10. An apparatus as set forth in claim 8 and including:

(a) a transparent layer positioned in overlying relation to said liquid crystal display device; and (b) said barcode start pattern being imprinted on said layer at one end of said barcode pattern and a barcode stop pattern imprinted on said layer at an opposite end of said barcode pattern.

11. An apparatus as set forth in claim 8 and including:

(a) said barcode start indicia including a plurality of barcode start display elements positioned at said start end of said barcode pattern and forming said barcode start pattern;

(b) said barcode stop indicia including a plurality of barcode stop display elements positioned at an opposite stop end of said barcode pattern from said barcode start pattern and forming said barcode stop pattern; and (c) said barcode start and stop display elements being activated whenever said liquid display device is activated.

12. An apparatus as set forth in claim 8 and including:

(a) said input circuitry including a digital to analog converter circuit operative to convert an analog electrical level to said numeric code.

* * * * *